(12) United States Patent
Dizdarevic et al.

(10) Patent No.: US 7,854,409 B2
(45) Date of Patent: Dec. 21, 2010

(54) CANARDED DELTOID MAIN WING AIRCRAFT

(76) Inventors: Faruk Dizdarevic, 2028 W. Hartford Pl., 61, Anaheim, CA (US) 92801; Mithad Dizdarevic, 2028 W. Hartford Pl., 61, Anaheim, CA (US) 92801

( * ) Notice: Subject to any disclaimer, the term of this patent is extended or adjusted under 35 U.S.C. 154(b) by 0 days.

(21) Appl. No.: 12/764,925

(22) Filed: Apr. 21, 2010

(65) Prior Publication Data

US 2010/0224735 A1   Sep. 9, 2010

Related U.S. Application Data

(62) Division of application No. 12/347,997, filed on Dec. 31, 2008, now Pat. No. 7,793,884.

(51) Int. Cl.
*B64C 39/12* (2006.01)
(52) U.S. Cl. .................... 244/45 A; 244/36; 244/117 R
(58) Field of Classification Search ................ 244/12.1, 244/13, 36, 117 R, 45 A, 119, 54, 91, 199.1, 244/198, 35 R; D12/331, 333, 337
See application file for complete search history.

(56) References Cited

U.S. PATENT DOCUMENTS

| | | | |
|---|---|---|---|
| 3,576,300 A | 4/1971 | Palfreyman | |
| 3,625,459 A | 12/1971 | Brown | |
| 3,761,041 A | 9/1973 | Putman | |
| 4,149,688 A | 4/1979 | Miller, Jr. | |
| 5,893,535 A | 4/1999 | Hawley | |
| 6,923,403 B1 | 8/2005 | Dizdarevic et al. | |

OTHER PUBLICATIONS

"Modell" French Journal: Gazette-Air & Cosmos No. 1386, Jul. 1992, p4 (see attachment—non-black and white drawings).
"Model2" French Journal: Gazette-Air & Cosmos No. 1386, Jul. 1992, p4 (see attachment—non-black and white drawings).
"Boeing X-48". Available at: http://en.wikipedia.org/wiki/Boeing_X-48. Apr. 15, 2010.
Parker, Ann. "Bringing Hypersonic Flight Down to Earth". Available at: https://www.llnl.gov/str/Carter.html Apr. 15, 2010.
"Concorde". Available at: http://en.wikipedia.org/wiki/Concorde. Apr. 15, 2010.
"SR-71 Black Bird". Available at: http://www.lockheedmartin.com/aboutus/history/SR71Blackbird.html. Apr. 15, 2010.

(Continued)

*Primary Examiner*—Benjamin P Lee (57) ABSTRACT

Canarded deltoid main wing aircraft idea allows for design of large supersonic civil and military aircraft with cruising speeds of up to Mach 3 at the altitude of over 25,000 meters. The fuel consumption per unit of payload of such aircraft would be at least twice lower with a longer range of over 50% when compared to existing supersonic aircraft of the same size. Simultaneously, the flight safety and ride quality during takeoff and landing at low speeds would be similar to the existing subsonic passenger aircraft. A low fuel consumption, long range, high ride quality, and high flight safety of these aircraft are widely opening a door for design of supersonic long range continental and intercontinental passenger aircraft that would be highly competitive with existing long range high subsonic passenger aircraft.

2 Claims, 4 Drawing Sheets

OTHER PUBLICATIONS

"Eurofighter Typhoon". Available at: http://www.eurofighter.com/et_tp_po.asp. Apr. 15, 2010.

"Tu-160 Blackjack (Tupolev)". http://www.fas.org/nuke/guide/russia/bomber/tu-160.htm. Apr. 15, 2010.

U.S. Appl. No. 12/347,997, filed Dec. 13, 2008, Dizdarevic, Faruk, p. 3.

CANARDED DELTOID MAIN WING AIRCRAFT

BACKGROUND OF INVENTION

Supersonic speeds generally require sharp front edges of flying objects with high sweepback angles to generate smallest possible front shock waves, as well as small wetted and airlifting area. These requirements for low wetted and airlifting area, as well as a low pitch control efficiency of flying wing objects that have large airlifting area are the main reason as to why there have been very few prior embodiments based on flying wing idea for supersonic aircraft.

One of the few prior art embodiments based on flying wing ideas is "Hypersoar" project. It represents a typical example of the flying wing idea for high supersonic and hypersonic aircraft. It is based on "Wave Rider" theoretical principle for the airlift generation of objects flying at hypersonic speeds, which further involved the integration of scramjet engines on the trailing edge of the lower surface of the aircraft. The Hypersoar aircraft represents a theoretical optimization of aircraft exclusively for hypersonic speeds, whereas it would be very difficult to be built as a realistic aircraft that is capable for takeoff and landing on its own.

Tailess supersonic aircraft with fuselage and deltoid wings that are shifted to the end of fuselage represent a realistic basis for building supersonic aircraft that are capable of takeoff and landing. A typical representation of this supersonic aircraft concept is passenger aircraft "Concorde" and military fighter aircraft "Mirage 2000". The absence of tailplane is reducing aircraft drag at supersonic speeds, thus reducing fuel consumption and increasing aircraft range. The "Concorde" aircraft has a specific shape of the wings' leading edge and a smooth integration thereof with the front portion of fuselage, hence resembling the flying wing idea. The shape of the wings' leading edge that is optimized for both supersonic and subsonic speeds is generating low wave shocks across its span at supersonic speeds, while simultaneously providing for a sufficient lift production at low speed and a sufficient efficiency of outer wings for roll control at low speeds. However, a significant disadvantage of this concept is related to inability to use trailing edge devices for extra lift production, thus requiring a high landing speed at high attack angles, hence jeopardizing the flight safety of aircraft.

Supersonic aircraft with fuselage and deltoid wings shifted in aft direction, as well as small pivotal canards in front of wings represent a more recent supersonic aircraft concept with intention to increase the pitch control of aircraft while deploying trailing edge flaps at lower speeds. Typical representations of this concept are military aircraft "Rafale" of France and "Eurofighter". A gentle front all-pivotal canard is increasing the aircraft safety at subsonic speeds relative to supersonic aircraft without canards.

All supersonic aircraft with fuselage are generating high wave drag in the joint area between thin wings and a robust fuselage. Therefore, many design solutions for supersonic aircraft are aiming to widen and flatten the lateral portions of fuselage to minimize the interference wave drag and involve the fuselage in airlift production at low speed. That's why many classical supersonic tailed aircraft have a widened fuselage with large wings' leading edge strake that is extending close to the proximity of aircraft nose in order to minimize the interference drag and increase lift production at low speed. Typical representations of such design are the Russian military aircraft MIG-29 and strategic bomber "Black Jack", as well as military aircraft F-14 and F-15 of U.S. The supersonic aircraft SR-71, also known as "Black Bird" by Lockheed Martin is a canardless and tailless version of the supersonic aircraft with deltoid wings that are joined to the rear portion of fuselage. The fuselage is wide with sharp chins on both lateral sides thereof. The fuselage chins are smoothly integrated with wings leading edge. This supersonic aircraft is closest to the idea of supersonic flying wing aircraft that have been realized by now, which is holding the current speed record of over Mach 3.2. while using air breathing engines.

BRIEF SUMMARY OF INVENTION

Our canarded deltoid main wing aircraft idea is providing for the following advantages:

a) Ability to design large supersonic aircraft with a simple and highly aerodynamically efficient integral airlifting body that provides for a significantly higher payload and airlifting capacity of canarded deltoid main wing aircraft with the same outer dimensions and wetted area when compared to supersonic aircraft that are designed with parasitic fuselage. Simple and open outer surfaces with low curvatures of the integral airlifting body are providing for low interference wave drag across the wing span, while allowing for utilization of advanced light composite materials, thus additionally improving the aerodynamic efficiency that is resulting with a lower fuel consumption and longer range of canarded deltoid main wing aircraft when compared to supersonic aircraft with the parasitic fuselage body.

b) Ability by canarded and large integral airlifting body with a canard that is positioned in front of gravity center at a long distance in order to provide for the efficient pitch control of aircraft in all flight regimes, whereby allowing a deployment of trailing edge devices for extra lift production during takeoff and landing with a relatively small wetted area of canard surfaces. Efficient pitch control and deployment of trailing edge devices for extra lift production are providing for a high ride quality and flight safety of supersonic canarded deltoid main wing aircraft that is based on flying wing idea in all flight regimes.

Accordingly, besides the objects and advantages of the prior art as described in our patent application, the several objects of canarded deltoid main wing aircraft are:

1. Identify the most favorable shape of integral airlifting body in order to provide for accommodation of bulky payload within aerodynamic surfaces that are generating low drag and a sufficient lift of aircraft at both supersonic and subsonic speeds.
2. Identify the most favorable shape and position of canards relative to the integral airlifting body and aircraft gravity center in order to provide for efficient pitch control, good visibility from the cockpit in all flight regimes, and the highest possible extra lift production at low attack angle of aircraft during landing.
3. Identify the most favorable position and shape of connecting means by which the canard is joined to the airlifting body, as well as the most favorable integration of connecting means with airlifting body in order to provide for the lowest possible wetted area of connecting means, the lowest interference drag between connecting means, the airlifting body, as well as the unobstructed rotation of canards around their axes of rotation and a safe transfer of all aerodynamic and inertia forces of canards into the airframe of integral airlifting body.

Further objects and advantages of this invention will become apparent from a consideration of ensuing description and drawings. Although description contains many specifics, these should not be construed as limiting the scope of the invention but rather merely providing the illustrations of some of the presently preferred embodiments of the invention, thus the scope of the invention should be determined by the appended claims and their legal equivalents rather than by given examples.

SHORT DESCRIPTION OF DRAWINGS

FIG. 1 shows two views of an aircraft with reference numerals that is based on Canard Deltoid Main Wing (CDMW) aerodynamic configuration with all-pivotal canards.

FIG. 2 shows three basic views of a long-range supersonic passenger aircraft that is based on CDMW aerodynamic configuration with all-pivotal canards. It is configured as a business aircraft with up to 130 seats, while being optimized for speeds of up to Mach 2.5 and flight regime at the altitude of over 20,000 meters.

FIG. 3 shows three basic views of a strategic supersonic bomber that is based on CDMW aerodynamic configuration with all-pivotal canards. This aircraft is designed to have a high lift capacity, long-range, low radar and visual reflection, high level of maneuverability at combat speed, and economical cruising speed of up to Mach 2.5.

FIG. 4 shows three basic views of a supersonic aircraft with reference numerals that is based on CDMW aerodynamic configuration with front portions of canard sections being fixedly fastened to deltoid main wing via canard connection means. This configuration allows for higher supersonic speeds of up to Mach 3.0 due to a more robust airframe configuration.

REFERENCE NUMERALS IN DRAWINGS 22 deltoid main wing
24 deltoid longitudinal diagonal
26 deltoid transversal diagonal
28 longitudinal diagonal leading tip
30 longitudinal diagonal trailing tip
32 transversal diagonal lateral tips
34 main wing leading edge
36 main wing trailing edge
38 main wing upper surface
40 main wing under surface
42 outer wings
44 outer wing leading edge
46 outer wing trailing edge
48 outer wing root airfoil
52 wing transition sections
54 wing transition section leading edge
56 wing transition section trailing edge
68 fin with rudder
90 canard sections
92 canard section leading edge
94 canard section trailing edge
96 canard connecting means
98 canard connecting means leading edge
100 canard connecting means leading tip
102 retractable trailing edge flaps
104 canard sections front portion
106 canard sections rear portion

DETAILED DESCRIPTION OF THE INVENTION

Figure 1A:
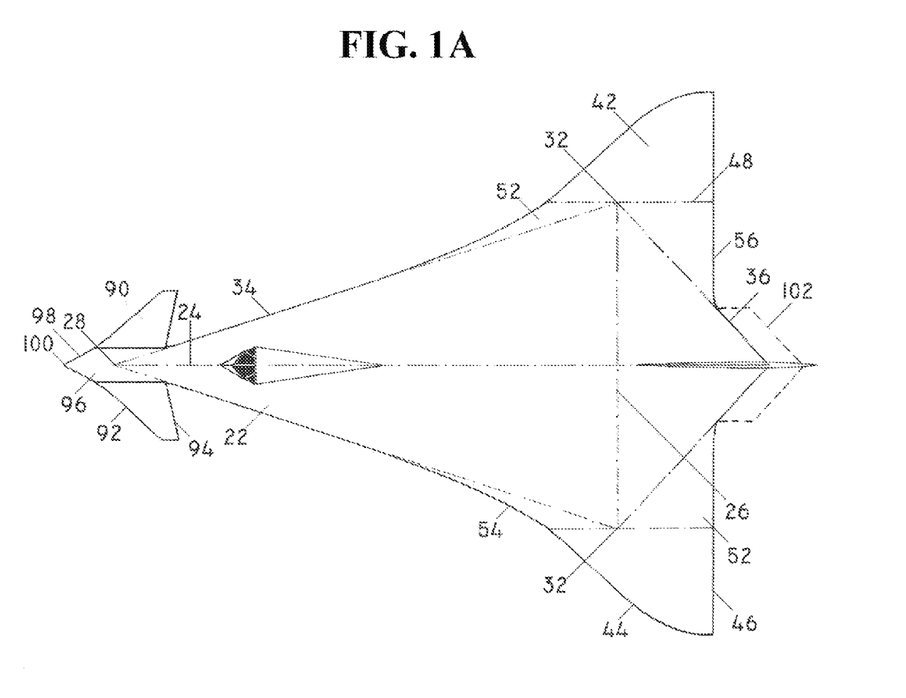
Figure 1B:
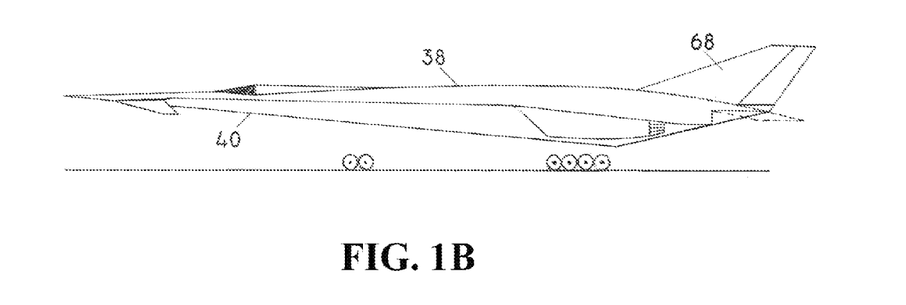
Figure 2A:
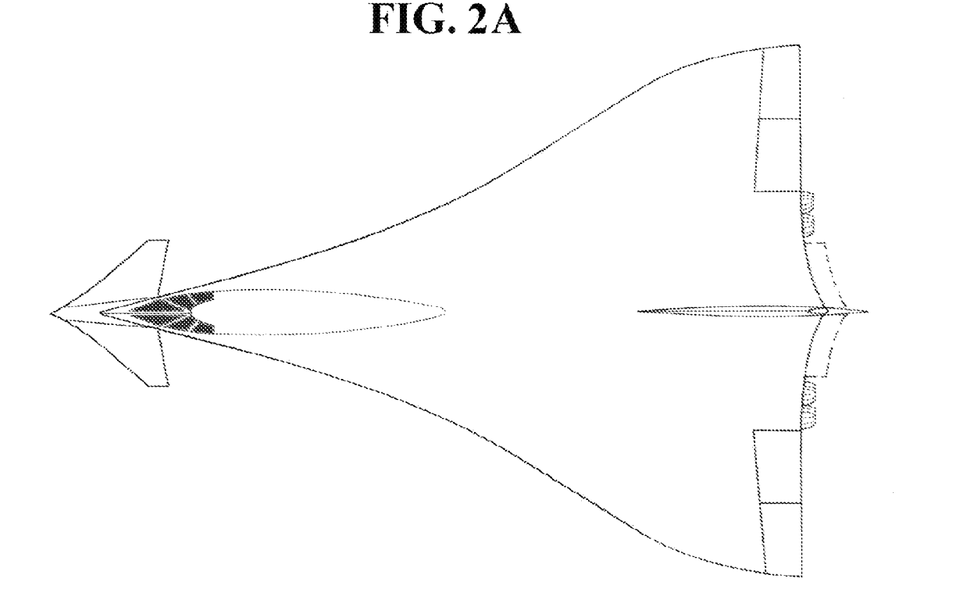
Figure 2B:
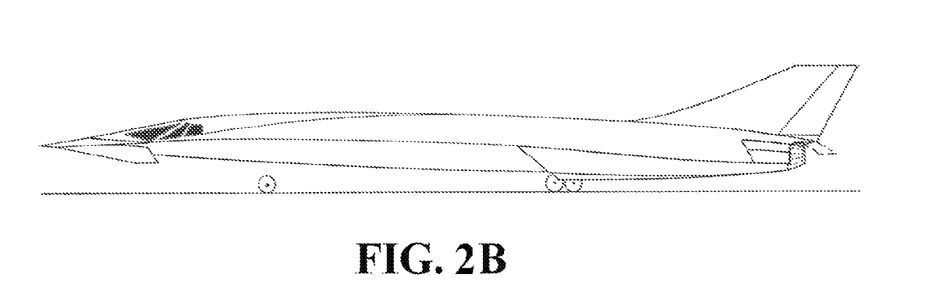
Figure 2C:
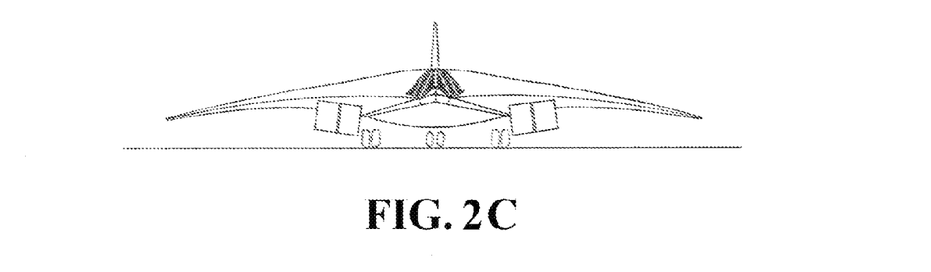
Figure 3A:
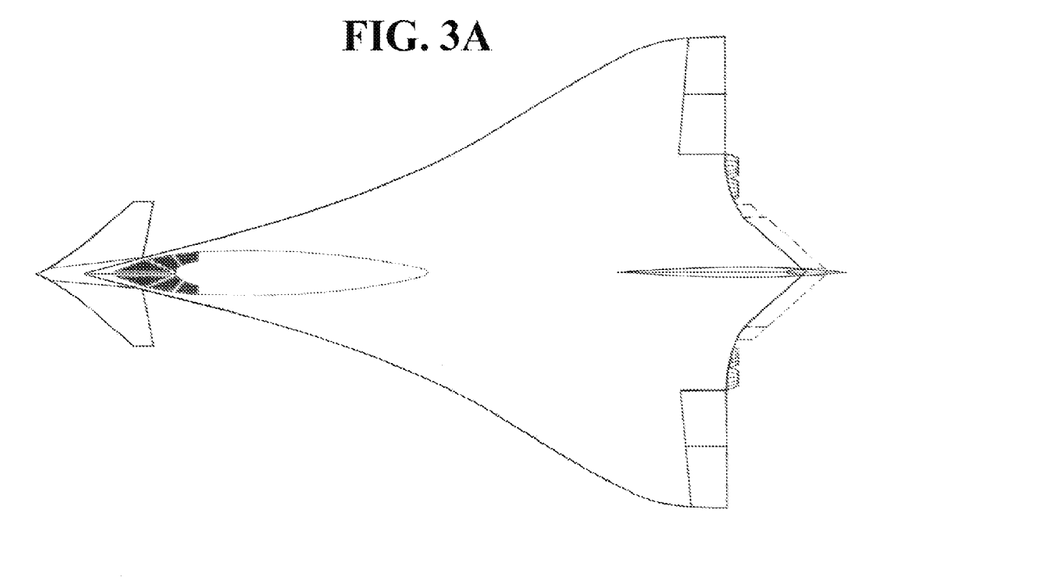
Figure 3B:
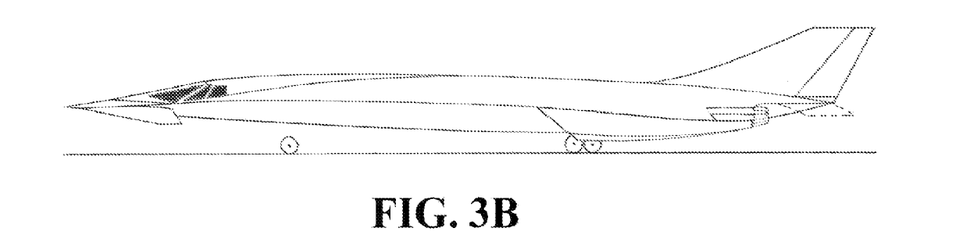
Figure 3C:
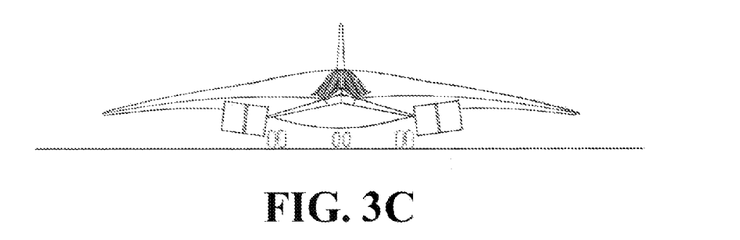

FIGS. 1, 2, and 3 show aircraft that are based on a Canard Deltoid Main Wing (CDMW) aerodynamic configuration with all-pivotal canard sections (90). This aerodynamic configuration includes main wing (22), outer wings (42), and outer wing transition sections (52) that constitute the integral airlifting surface of aircraft, as well as canard sections (90) and canard connecting means (96). The longitudinal diagonal (24) of the main wing has a highly pronounced fore position relatively to transversal diagonal (26) in order to provide for a high efficiency of canard sections (90) in pitch control of aircraft (FIGS. 1, 2, and 3). A distinctly fore position of longitudinal diagonal (24) is providing for a high sweepback angle of main wing leading edge (34) and a distinctly aft position of lateral tips (36) where outer wings (42) are joined main wing (22), thereby CDMW aerodynamic configuration being applicable for high transonic and supersonic aircraft. Main wing (22) is distinctly longitudinally oriented in order to optimize the aircraft configuration for supersonic speeds, while outer wings (42) of the CDMW aircraft have a short span and a high sweepback angle of outer wing leading edge (44). At the same time, outer wing trailing edge (46) has the sweepback angle close to zero or even a forward sweep angle in order to result with a long airfoil chord of outer wings (42) and provide for a sufficient bending momentum resistance of outer wings (42), which are defined with low-relative-thickness airfoils that are adjusted for supersonic speed. Outer wing leading edge (44) and wing transition section leading edge (54) have specific shapes as shown in FIGS. 1, 2, and 3 in order to generate the optimal distribution of small wave shocks across the entire aircraft span and minimize the wave drag at supersonic speed, while at the same time providing for a sufficient aerodynamic efficiency of outer wings (42) and wing transition sections (52) at low speed during takeoff and landing of aircraft. The pivotal trailing section of outer wings (42) of supersonic aircraft as shown in FIGS. 1, 2, and 3 are having the role of elevons. The symmetrical left and right sections of all-moving pivotal canard sections (90) are joined main wing (22) in the vicinity of longitudinal diagonal leading tip (28). Canard sections (90) are fastened to main wing (22) by canard connecting means (96). The airframe of canard connecting means (96) is fully integrated with the airframe of main wing (22). The airframe of canard connecting means (96) is designed to be able to successfully transfer all aerodynamic and inertia forces of canard sections (90), as well as its own aerodynamic and inertia forces into the airframe of main wing (22). Also, the external shape of canard connecting means (96) is smoothly integrated with main wing (22) in order to generate the optimal lift and minimal drag forces in all flights regimes, thus canard connecting means (96) is acting as an additional section of the integral airlifting surface of CDMW aircraft. Canard connecting means (96) is having canard connecting means leading edge (98) and canard connecting means leading tip (100). Canard connecting means (96) overlaps longitudinal diagonal leading tip (28) of main wing (22) in fore direction, hence canard connecting means leading tip (100) being the nose of CDMW aircraft. The shape and the longitudinal position of canard connecting means leading tip (100) needs to be optimized to form the smallest possible front shock wave at supersonic speeds. The above requirement consequently results with a high sweepback angle of canard connecting means leading edge (98). Canard connecting means (96) as a leading forward section of the integral airlifting surface is having a negative influence on the longitudinal dynamic stability of CDMW aircraft, thus should have the lowest possible aerodynamic reflection. The lateral sides of canard connecting means (96) are flat surfaces that are oriented in airflow direction while being perpendicular to the axis of rotation of canard sections (90), hence allowing for the unobstructed rotation of canard sections (90). The upper surface of canard connecting means (96) extends in aft direction to the cockpit visor, while the under surface of canard connecting means (96) practically substitutes the central portion of main wing under surface (40), hence being smoothly streamlined along the entire length of main wing (22). The upper surface of canard connecting means (96) in the lateral direction is smoothly blended with upper surface of canard sections (90).

Canard sections (90) despite their relatively small aerodynamic surface area due to a very long distance from aircraft gravity center represent the main maneuvering surfaces for pitch control of CDMW aircraft. The contribution of canard sections (90) in pitch control of CDMW aircraft is crucial in all flights regimes especially at transonic and subsonic speeds including takeoff and landing flight regimes. All-moving aerodynamically very efficient canard sections (90) with their long distance from aircraft gravity center is providing for a very high pitch trim efficiency at cruising supersonic speeds, thus significantly increasing the total efficiency of aircraft when compared to the current supersonic aircraft that have delta wings without canards. Canard sections (90) provide for a high nose-up momentum around main landing gear during the take-off, thus significantly shortening the length of the take-off runaway. During airport approach and landing phase, canard sections (90) that are set at an angle which results with a high positive lift coefficient provide for a full deployment of trailing edge devices for extra lift production, thus resulting with a low approach and landing aircraft speed at a relatively low attack angle of aircraft, thereby significantly increasing the flight safety when compared to supersonic aircraft without canards. Additionally, a very large airlifting surface area with very long chords of main wing (22) are providing for a very smooth landing due to a significant ground effect. Canard sections (90) of the military versions of CDMW aircraft in combat actions at transonic and high-subsonic speeds at low altitudes provides for a high level of aircraft stability and pitch maneuverability, thus significantly increasing the probability of mission success, as well as the survivability of the pilot and the aircraft.

Canard sections (90) have a simple planform with a high sweepback angle of leading edge (92) and a low sweep angle of canard section trailing edge (94) in order to provide for a low wave drag at supersonic cruising speeds, while simultaneously providing for a sufficient efficiency of canard sections (90) for pitch control of aircraft at low speeds including takeoff and landing flight regimes. On the other hand, a high sweepback angle of leading edge (92) and a low sweepback angle or forward sweep angle of canard section trailing edge (94) provide for a sufficient bending resistance of the canard airframe despite a relatively thin airfoils of canard sections (90). Canard section leading edge (92) and canard connecting means leading edge (98) are acting as a smooth forward leading edge in cruising speed conditions whose shape provides for a relatively small wave shocks across the entire span of the forward leading edge. Canard sections (90) are having a distinct anhedral angle (up to 18°) in order to provide for a sufficient cockpit visibility especially during landing, as well as to provide for an unobstructed airflow over the main upper surface (38) at all speeds, especially during takeoff and landing. On the other hand, the anhedral angle of canard sections (90) requires the lateral flat surfaces of canard connecting means (96) to be deflected towards the aircraft symmetry plane in downward direction, whereby cross section shapes of canard connecting means (96) being similar to the cross section shapes of main wing (22) to facilitate a smooth integration of canard connecting means (96) with main wing (22) in longitudinal direction. The longitudinal position of axis of rotation of canard sections (90) along the root airfoil chord of canard sections (90) should provide for the lowest possible momentum of canard aerodynamic forces around the axis of rotation to minimize the required power for canard rotation in all flights regimes. Canard airfoils should be designed and optimized to generate as low wave drag as possible at supersonic cruising speed, while at the same time the canard airfoils should produce the highest possible positive lift coefficients at low speeds and high attack angles when canards are deflected to higher positive angles in order to produce extra lift or generate a high aircraft nose-up pitch momentum. Airfoils of main wing (22) in the central area where payload is disposed should be optimized to generate the lowest possible wave drag, while at the same time providing required height for payload disposal. All other airfoils of the integral airlifting surface are designed to reach the highest possible aerodynamic efficiency at the supersonic cruising speed. In addition, the upper camber of all airfoils of the integral airlifting surface should have a smoothly curved shape in order to attain a sufficient aerodynamic efficiency of aircraft at high subsonic and transonic speeds and a sufficient lift during takeoff and landing. Fully retractable trailing edge flaps (102) can be mounted on the rear central portion of main wing (22). Retractable trailing edge flaps (102) are gliding on fixed coulisses and can be locked at any extracted position. The upper surface of retractable trailing edge flaps (102) is aerodynamically shaped in such a way that it is smoothly blended with main wing trailing edge (36) in every extracted position. Retractable trailing edge flaps (102) when being extracted are increasing aircraft lift by increasing the integral airlifting surface area, especially when increasing the upper camber of the large central section of main wing (22). The extracted position of retractable trailing edge flaps (102) can be programmatically optimized for different Mach numbers. The extra lift production during takeoff and landing by CDMW aircraft is generated by the simultaneous increase of the attack angle of canard sections (90), a deflection of elevons in downward direction, and by extracting the retractable trailing edge flaps (102) to the outermost extracted position. The pitch maneuver of CDMW aircraft can be performed by either canard sections (90) or elevons of outer wings (42) or by a simultaneous action of both canard sections (90) and elevons. The roll maneuver of CDMW aircraft is performed only by elevons when they're acting as ailerons. The yaw maneuver and directional control of the CDMW aircraft is performed by fin with rudder (68) that is joined main wing (22) on the rear portion thereof over the main wing upper surface (38) in the symmetry plane near the longitudinal diagonal trailing tip (30). Jet engines of CDMW aircraft with their nacelles are located under the integral airlifting surface, which is a typical position for large supersonic aircraft. One of the significant challenges related to CDMW aircraft is to find the best design solution for cockpit visor in order to meet two opposite requirements including a good cockpit visibility in all flights regimes and low wave drag in the supersonic cruising regime. The challenge is to create the best shape of the cockpit visor and find the best position of the cockpit along the longitudinal axis of aircraft.

FIG. 2 shows a CDMW aircraft in three views that is aerodynamically optimized for cruising speeds of up to Mach 2.5 while flying at the altitude of over 20,000 meters. The aerodynamic optimization of such aircraft relates to the general optimization of shape, size, and mutual positions of main aerodynamic sections including main wing (22), outer wings (42), wing transition sections (52), canard sections (90), and canard transition sections (96) in order to reach a higher efficiency at target cruising conditions. Also, the shape and position of cockpit visor, the position of jet engine nacelles, as well as the shape, size, and position of fin with rudder (68) are additionally optimized relative to the aircraft as shown in FIG. 1. The aircraft span is significantly minimized by shortening both the length of transversal diagonal (26) of main wing (22) and the span of outer wings (42). The chord of outer wings (42) is significantly elongated. The span of canard sections (90) is shortened, while the sweepback angle of leading edge and chord lengths of canard sections (90) is significantly increased. The width of canard connecting means (96) is significantly shortened, while the sweepback angle of canard connecting means leading edge (98) is increased. The cockpit visor of the aircraft as shown in FIG. 2 is significantly shifted in fore direction toward the longitudinal diagonal leading tip (28), whereby the width of main wing (22) is much shorter, hence main wing leading edge (34) is very close to lateral cockpit windows, thus providing for an unobstructed lateral view in downward direction aft of canard sections (90), thereby significantly increasing the aircraft safety during landing when compared to aircraft as shown in FIG. 1. Also, canard transition section leading tip (100) is additionally shifted in downward direction relatively to cockpit visor, thus increasing the angle of the frontal view when compared to aircraft as shown in FIG. 1. The shift of canard transition section leading tip (100) in downward direction is additionally significantly increasing the height of canard connecting means (96) and the front portion of main wing (22) behind canard sections (90), thus providing for the increase of bending resistance of the airframe of canard transition section (90) and main wing (22) in the vicinity of canard joint, while simultaneously providing for increased internal cockpit height. The central front reinforcement of cockpit visor, which is raising up from the upper surface of canard connecting means (96) has a higher sweepback angle and a sharp front edge in order to minimize wave shocks that are generated around the cockpit visor. The bottom section of the front cockpit airframe is fully integrated with the airframe of canard connecting means (96) in order to additionally increase the bending resistance of the front aircraft section to enable a successful transfer of all forces of canard sections (90) and canard connecting means (96) into the airframe of main wing (22).

Aerodynamically optimized aircraft shape as shown in FIG. 2 can be used to develop a realistic aircraft project for different civil and military applications by introducing additional smaller aerodynamic shape optimizations depending on particular application. The civil aircraft require a higher level of longitudinal dynamic stability with positive static margin, a higher level of flight safety at low speeds, and low fuel consumption per unit of payload. Furthermore, a higher level of longitudinal dynamic stability requires the shift of outer wings (42) in aft direction. A higher level of flight safety at low speeds requires the increase of aircraft span, while low fuel consumption requires low wing loading in order to reach the economical cruising speed at the highest possible altitude where the air density and wave drag are lower. The optimized aircraft version for a civil passenger application is shown in FIG. 2.

Military aircraft generally require a lower visual and radar visibility, a higher level of aircraft maneuverability, and the longest possible combat radius or flight autonomy. Furthermore, the lower level of aircraft visual reflection requires smaller aircraft dimensions. A higher level of aircraft maneuverability requires the shift of outer wings (42) in fore direction and a decrease of aircraft span. All of these specific adjustments that are depending on the specific aircraft application will not significantly change the overall layout of aircraft as shown in FIG. 2.

Generally, supersonic aircraft including the supersonic aircraft based on deltoid main wing aerodynamic configuration cannot be competitive with deltoid main wing high-subsonic and transonic aircraft for mass civil air transportation due to higher fuel consumption per unit of payload of supersonic aircraft. However, there is a potential market for business supersonic long-range continental and intercontinental aircraft with routes among large world business centers. The cruising speed would be adjustable and ranging between Mach 2 and 2.5. A CDMW aircraft as shown in FIG. 2 that is optimized for civil applications and scaled in size for the capacity between 120 and 150 passengers would have dimensions and performance as shown in table T-3 below. The same table shows comparative data with "Concorde" aircraft, which is the only passenger supersonic aircraft that has been commercially produced so far.

TABLE T - 1

Comparison Between CDMW and Concorde Aircraft

| CATEGORY | CONCORDE | CDMW - FIG. 2 |
| --- | --- | --- |
| Wing Span [m] | 25.6 | 29.4 (14.8% larger) |
| Length Overall [m] | 61.66 | 48.45 (21.42% shorter) |
| Height Overall [m] | 12.2 | 7.8 (36% lower) |
| Wing Area [$m^2$] | 358.25 | 576 (60.8% larger) |
| Canard Area [$m^2$] | — | 18.5 |
| Retractible Trailing Edge Flaps Area [$m^2$] | — | 7.92 |
| Effective Airlifting Surface Area at Supersonic Cruising Speed [$m^2$] | 358.25 | 594.5 (66% larger) |
| Effective Airlifting Surface Area During Takeoff and Landing [$m^2$] | 358.25 | 602.42 (68.2% larger) |
| Fin With Rudder Area [$m^2$] | ~44 | 34 (22.7% smaller) |
| Fuselage Surface Area [$m^2$] | ~1,030 | — |
| Total Aircraft Wetted Area [$m^2$] | ~1,950 | ~1,600 (18% smaller) |
| Passenger Capacity - two class arrangement (no. of passengers) | 100 | 120 (20% higher) |
| Passenger Capacity Max. (no. of passengers) | 128 | 144 (12.5% higher) |
| Operating Weight Empty [kg] | 78,800 | ~55,000 (30% lower) |
| Payload Weight Max. [kg] | 13,380 | 15,000 (12% heavier) |
| Fuel Weight Max. [kg] | 95,680 | 120,000 (25.4% heavier) |

TABLE T - 1-continued

Comparison Between CDMW and Concorde Aircraft

| CATEGORY | CONCORDE | CDMW - FIG. 2 |
|---|---|---|
| Takeoff Weight Max. [kg] | 185,880 | 190,000 (2.2% heavier) |
| Landing Weight - 20% Fuel [kg] | 111,316 | 94,000 (15.6% lighter) |
| Airlifting Loading During Takeoff [kg/m$^2$] | 521.6 | 315.4 (39.5% lower) |
| Airlifting Loading During Landing [kg/m$^2$] | 310.7 | 156 (49.8% lower) |
| Cruising Speed at Max. Altitude | Mach 2.04 at 18,288 m | ~Mach 2.8 (37.25% faster) at 26,000 m (42% higher) |
| Max. Range [km] | 7,200 | ~12,500 (73.6% longer) |

The estimated value of operating weight empty of the CDMW aircraft as shown in FIG. 2, which is 30% lower when compared to Concorde aircraft is based on the fact that the CDMW aircraft has 18% smaller wetted area, while almost 100% of the airframe is made of advanced composite materials (stronger and more than twice lighter than aluminum), whereas the mutual distribution of aerodynamic and inertia forces is much more favorable when compared to Concorde aircraft. The estimated 37% higher cruising speed at 42% higher altitude of the CDMW supersonic passenger aircraft as shown in FIG. 2 when compared to Concorde supersonic passenger aircraft is based on the facts that the supersonic passenger aircraft as shown in FIG. 2 has 66% larger airlifting surface area, 39.5% lower specific wing loading, and 18% smaller total wetted area. The lower specific wing loading and larger airlifting surface area of CDMW aircraft enables the horizontal flight in the cruising speed configuration at a significantly higher altitude when compared to Concorde aircraft. In return, a significantly higher altitude where the air density is significantly lower combined with additional 18% smaller total wetted area provide for an increase in the cruising speed of CDMW aircraft with the same engine thrust as the one of the Concorde supersonic aircraft. Furthermore, the increased cruising speed of CDMW aircraft is providing for an additional increase in altitude where the air density is lower, hence resulting with lower drag. This positive feed of ever increasing altitudes and speeds are supporting each other and providing for the increase in speed of 37% and altitude of 42% of the CDMW aircraft as shown in FIG. 2 when compared to Concorde aircraft with the same engine thrust.

The higher economical cruising speed of 37%, as well as the higher payload capacity of 12% of CDMW aircraft when compared to Concorde with the same power plant is resulting with the lower fuel consumption of 55% per unit of payload of CDMW aircraft. Also, the 37% higher economical cruising speed and 25.4% higher fuel capacity of CDMW aircraft are resulting with 73% longer range when compared to Concorde. Additionally, the aerodynamically very efficient pivotal canard sections (90) with a very long arm from the aircraft gravity center are significantly increasing the pitch trim efficiency at supersonic cruising speeds when compared to Concorde, thus additionally reducing the fuel consumption and increasing the range of CDMW aircraft.

Canard sections (90) are decreasing the natural longitudinal stability of CDMW aircraft. However, canard sections (90) are very efficient pivotal pitch maneuvering surfaces with a very long arm from the gravity center, hence significantly increasing fly-by-wire longitudinal static stability of CDMW aircraft as shown in FIG. 2. In addition, canard sections (90) as a pivotal airlifting surface when being set at a positive attack angle are generating a high positive pitch momentum due to a very long distance of canard sections (90) from the aircraft gravity center. Such high positive pitch momentum allows for a full deployment of trailing edge devices for extra lift production (elevons and retractable trailing edge flaps), thereby providing for a high lift coefficient of the integral airlifting surface of the CDMW aircraft as shown in FIG. 2 at low speeds during takeoff and landing. A high lift coefficient of the integral airlifting surface that is generated by trailing edge devices for extra lift production and a very low airlifting loading of CDMW aircraft during landing (only 156 kg/m$^2$, which is 50% less when compared to Concorde) is resulting with a low speed at low attack angles during airport approach and landing, thereby providing for a significantly higher level of safety, as well as a significantly shorter takeoff and landing runway when compared to Concorde. Also, a simultaneous deflection of canard sections (90) and elevons (up or down) generates a significantly higher pitch momentum and consequently a higher level of pitch control and pitch maneuverability when compared to Concorde, thereby additionally significantly increasing the flight safety of CDMW aircraft at low speed.

CDMW aerodynamic configuration is geared more towards military applications especially for a supersonic strategic high-weapons-capacity bomber. Table T-4 below shows comparative data between the supersonic strategic bomber B-1 and the supersonic CDMW bomber as shown in FIG. 3, which carries 30,000-40,000 kg of weaponry.

TABLE T - 2

Comparison Between CDMW and B1-B Aircraft

| CATEGORY | B-1B | CDMW - FIG. 3 |
|---|---|---|
| Wing Span (fully spread) [m] | 41.67 | 26.24 (37% shorter) |
| Wing Span (fully swept) [m] | 23.84 | 22.75 (4.6% shorter) |
| Length Overall [m] | 44.81 | 46.56 (3.91% longer) |
| Height Overall [m] | 10.36 | 5.25 (49.3% lower) |
| Wing Area [m$^2$] | 181.2 | 472.35 (160.7% larger) |
| Tailplane Area [m$^2$] | 43 | — |

TABLE T - 2-continued

Comparison Between CDMW and B1-B Aircraft

| CATEGORY | B-1B | CDMW - FIG. 3 |
|---|---|---|
| Canard Area [m$^2$] | — | 12.2 |
| Retractible Trailing Edge Flaps Area [m$^2$] | — | 10.75 |
| Fin With Rudder Area [m$^2$] | ~23 | ~23.6 (the same) |
| Effective Airlifting Surface Area at High Speed [m$^2$] | 181.2 | 367.8 (103% larger) |
| Effective Airlifting Surface Area at Low Speed [m$^2$] | 181.2 | 378.55 (108.9% larger) |
| Fuselage Surface Area [m$^2$] | ~420 | — |
| Total Wetted Area [m$^2$] | ~950 | ~1020 (7.4% larger) |
| Operating Weight Empty [kg] | 87,090 | ~45,000 (48.3% lighter) |
| Weapons Load, Max. [kg] | 34,019 | 35,000 (2.9% heavier) |
| Fuel Weight Max. [kg] | 88,450 | 90,000 (1.8% heavier) |
| Takeoff Weight Max. [kg] | 216,365 | 206,000 (4.79% lighter) |
| Airlifting Loading, Max. [kg/m$^2$] | 1,194 | 436.1 (63.5% lower) |
| Max. Level Speed | Mach 1.2 | ~Mach 2.5 (108% faster) |
| Cruising Speed | Mach 0.9 at 13,500 m | ~Mach 2.4 (167% faster) at 21,000 m (56% higher) |
| Low level Penetration Speed [km/h] | 965 | 1090 (12.95% higher) |
| Unrefueled Range, Max [km] | 12,000 | ~8,500 (29.17% shorter) |

The estimated value of 45,000 kg of operating weight empty of the supersonic CDMW bomber as shown in FIG. 3 is based on the comparison of its total wetted area and the total wetted area of the subsonic flying wing bomber B-2 although the airframe of such aircraft has a much more robust shape and a more favorable load distribution.

The estimated Mach 2.4 cruising speed and 21,000 m cruising altitude, as well as 8,500 km range without refueling of the supersonic CDMW bomber as shown in FIG. 3 are based on the comparison with Concorde that is much more similar to the bomber as shown in FIG. 3 than the bomber B1-B, which is actually a transonic aircraft. The supersonic bomber as shown in FIG. 3 has 16.39% smaller airlifting loading and 47% smaller total wetted area when compared to the Concorde aircraft. The lower airlifting loading is directly allowing for the flight at higher cruising altitudes, while indirectly resulting with a higher cruising speed with the same engine thrust due to a lower air density at higher altitudes, whereas the lower total wetted area is directly providing for a higher cruising speed due to lower friction drag, thus indirectly allowing for the flight at a higher cruising speed. Both of these effects combined together are providing for a cruising speed increase of approximately 17% and the increase in cruising altitude of 15% of the CDMW supersonic bomber relatively to the Concorde aircraft with the same power plant. Such increase in cruising speed with the same power plant would result with an increase of the supersonic bomber range to approximately 8,500 km. When compared to the existing strategic bomber B-1B, which is rather a transonic than a supersonic aircraft that has a cruising speed of Mach 0.9, the supersonic strategic bomber as shown in FIG. 3 is having approximately the same weapons capacity (2.9% higher), a cruising speed higher by more than 2.6 times at a higher cruising altitude of over 56%, higher low-level penetration speed of about 13% for special combat missions, a lower radar visibility due to smaller external dimensions, and a more favorable external shape including materials with lower radar reflection but a shorter range (combat radius) by about 30%. Multiply higher cruising speed of the supersonic bomber as shown in FIG. 3 is providing for multiply shorter time to reach the combat target, while together with a significantly higher cruising altitude, a lower radar visibility, and a higher low-level penetration combat speed is providing for a significantly higher level of aircraft survivability during combat missions. The shorter range of the supersonic bomber as shown in FIG. 3 is the result of a significantly higher drag at supersonic speeds despite a significantly higher cruising altitude.

However, the supersonic bomber as shown in FIG. 3 shows a different picture when compared with the Russian Tupolev supersonic bomber "Black Jack". The CDMW bomber as shown in FIG. 3 would have a significantly higher weapons capacity (over 114%) with significantly smaller external dimensions (33% shorter span and 25% shorter length), which is drastically decreasing radar visibility, while having a higher maximum speed by 8.7%, as well as a longer range of over 16%.

Although the supersonic CDMW aircraft as shown in FIG. 3 has a longer range than the existing supersonic bombers, the range of 8,500 km is inadequate relative to requirements for a strategic supersonic bomber. The most efficient way to increase the range of supersonic CDMW bomber is to increase the airlifting area thereof in order to provide for an adequate increase in fuel capacity. A rough aerodynamic simulation shows that a 33% increase of the airlifting surface area, as well as a 41% increase in fuel capacity of the supersonic CDMW bomber as shown in FIG. 3 would result with the increase of aircraft range to up to 12,000 km. In that case, the supersonic CDMW bomber would still have a 22% shorter span and 14% shorter overall length and 64% longer range when compared to the Russian strategic supersonic bomber "Blackjack".

Figure 4A:
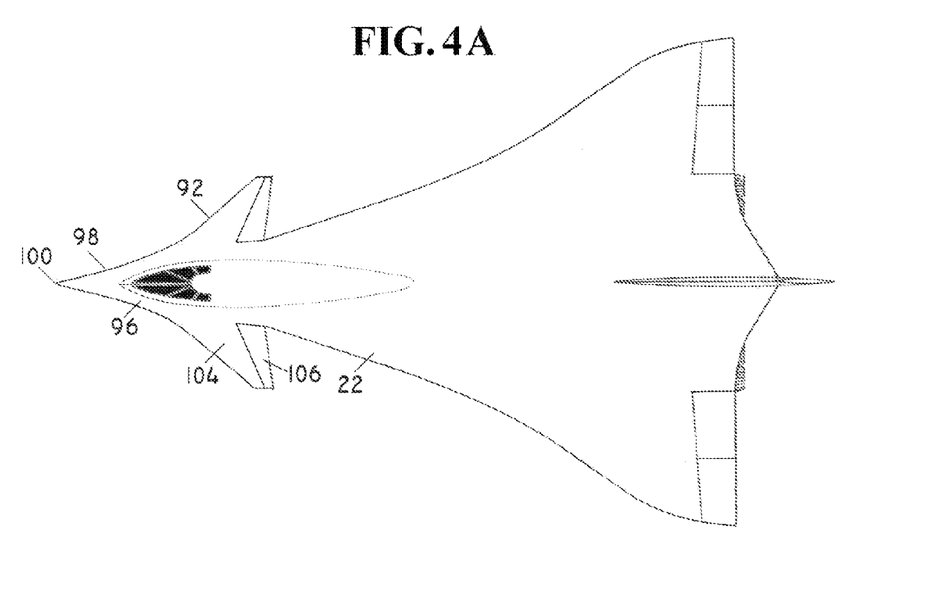
Figure 4B:
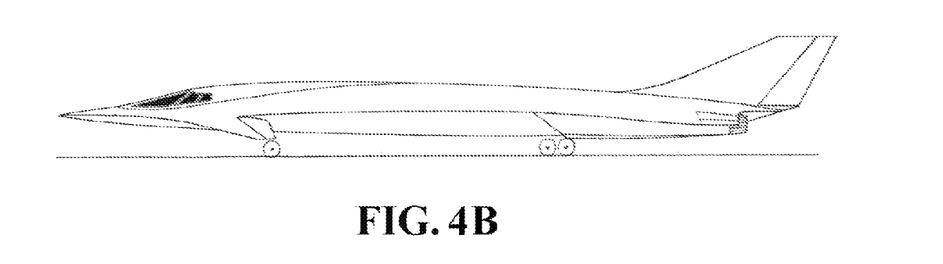
Figure 4C:
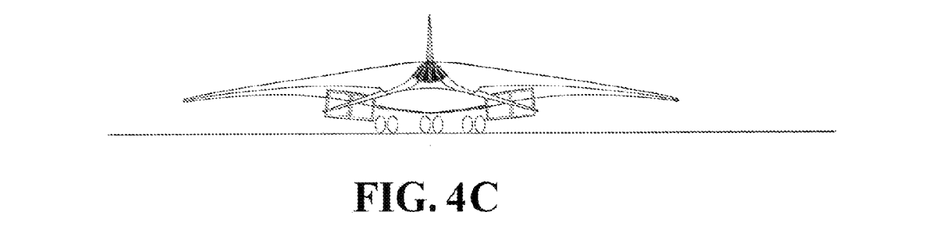

FIG. 4 shows three basic views of a supersonic canarded deltoid main wing aircraft with canard sections (90) consisting of front portion (104) and rear portion (106). Front portion (104) is fixed and structurally integrated with canard connecting means (96) on lateral sides thereof. Rear portion (106) is pivotally fastened to front portion (104). Canard connecting means leading edge (98) and canard section leading edge (92) are integrated into an uninterrupted rigid front leading edge of canarded deltoid main wing aircraft. Canard sections (90) of aircraft shown in FIG. 4 are shifted in aft direction behind front cockpit visor. This shift of canard sections (90) significantly extends canard connecting means leading edge (98), hence enabling a design of wider connecting means (96) with a higher sweepback angle of canard connecting means leading edge (98), thus consequently generating a significantly lower front wave shock of aircraft as shown in FIG. 4 at supersonic speeds when compared to aircraft in FIGS. 1, 2, and 3. The larger width of canard connecting means (96) is further enabling a much more favorable aerodynamic integration of canard connecting means (96), canard sections (90), and deltoid main wing (22) with cockpit, hence consequently providing for a significantly lower interference wave drag of the front portion of aircraft as shown in FIG. 4 when compared with aircraft in FIGS. 1, 2, and 3. The larger width of canard connecting means (96) and the full structural integration of canard sections front portion (104) is further providing for a much more robust front portion of aircraft shown in FIG. 4 when compared with aircraft in FIGS. 1, 2, and 3. The robust front portion allows the aircraft as shown in FIG. 4 to fly at much higher supersonic speeds, while simultaneously lowering the front wave shocks and interference wave drag, thus providing for a significantly lower fuel consumption at cruising supersonic speeds when compared to aircraft in FIGS. 1, 2, and 3 though the efficiency of pitch control of aircraft in FIG. 4 at supersonic speeds and especially at low speeds is lower than the same of aircraft shown in FIGS. 1, 2, and 3. Additionally, the visibility from the cockpit visor in cruising conditions, as well as during takeoff and landing of aircraft as shown in FIG. 4 is much better when compared to aircraft as shown in FIGS. 1, 2, and 3 due to cockpit visor being in front of canard sections (90).

We claim:

1. A canarded deltoid main wing aircraft having a symmetry plane and a transversal axis, said transversal axis being perpendicular to said symmetry plane, said symmetry plane including a longitudinal and a vertical axis, said longitudinal axis coinciding with airflow direction, said canarded deltoid main wing aircraft comprising:
   a. means for aerodynamic lift production, said means for aerodynamic lift production being symmetrical relative to said symmetry plane, the cross-sections of said means for aerodynamic lift production being shaped as airfoils in airflow direction, the central section of said means for aerodynamic lift production providing inner space for bulky payload accommodation, the central section leading edge consists of two symmetrical straight lines, said central section leading edge having a predetermined sweepback angle, said means for aerodynamic lift production having a predetermined airlifting area for a predetermined payload capacity of said canarded deltoid main wing aircraft, said means for aerodynamic lift production including a leading and a trailing edge;
   b. front means for pitch control, said front means for pitch control consist of a port and a starboard canard section, the port canard section and the starboard canard section being mutually symmetrical relative to said symmetry plane, said port and said starboard canard section having their own axes of rotation, the axes of rotation of said port and said starboard canard section being perpendicular to said longitudinal axis, said canard sections being pivotal around their axes of rotation, the cross-sections of said canard sections being shaped as airfoils in airflow direction, the canard section leading edge having a predetermined sweepback angle, said front means for pitch control having a predetermined aerodynamic area, said front means for pitch control being positioned in front of the gravity center of said canarded deltoid main wing aircraft, said port and starboard canard sections each having a leading and a trailing edge, said leading edge of said means for aerodynamic lift production extending from said tailing edge of said port and starboard canard sections;
   c. canard connecting means, said canard connecting means being symmetrical relative to said symmetry plane, said canard connecting means being joined to said central section on the front side thereof, the airframe of said canard connecting means being fully integrated with the airframe of said central section, said canard connecting means having an upper and a lower surface, as well as a left and a right lateral surface, said left lateral surface and said right lateral surface being shaped as flat plains, said canard sections being joined to said canard connecting means on both lateral sides thereof, said canard sections being pivotally fastened to said canard connecting means, said left and said right lateral surface being perpendicular to said axes of rotation of said port and said starboard canard section respectfully, thus providing for an unobstructed rotation of said canard sections around said axes of rotation, said upper and said lower surface of said canard connecting means in front of said left and said right lateral surface forming a leading edge and a leading tip of said canard connecting means, the canard connecting means leading tip being the nose of said canarded deltoid main wing aircraft, the canard connecting means leading edge and said canard section leading edge constituting a front leading edge of said canarded deltoid main wing aircraft in cruising speed conditions, said canard connecting means having a predetermined wetted area,
   whereby said predetermined sweepback angle of said central section leading edge, said airfoils and said predetermined airlifting area of said means for aerodynamic lift production, said predetermined sweepback angle of said canard section leading edge, said airfoils, and said predetermined aerodynamic area of said front means for pitch control, said predetermined wetted area, as well as the shapes of said leading edge and said leading tip of said canard connecting means altogether providing for a substantially higher payload capacity and lower fuel consumption per unit of payload of said canarded deltoid main wing aircraft at supersonic speeds when compared to canardless supersonic aircraft with deltoid wings and fuselage, while simultaneously said airfoils, said predetermined aerodynamic area, and the longitudinal position of said front means for pitch control providing for a substantially higher ride quality and flight safety of said canarded deltoid main wing aircraft during landing when compared with said canardless supersonic aircraft.

2. The canarded deltoid main wing aircraft as claimed in claim 1, wherein said port and said starboard canard section consisting of a front and a rear portion, the front portions of said port and said starboard canard section being firmly fixed to said canard connecting means, thus substantially increasing the rigidity of the joint between said canard sections and said canard connecting means, the rear portions of said canard sections being pivotally connected to said front portions to allow for the change of the camber and attack angle of said canard sections in flight conditions, hence providing for the efficient pitch control of said canarded deltoid main wing aircraft, whereby the increased rigidity of said joint allowing for a substantial higher safety at high supersonic speeds of said canarded deltoid main wing aircraft with the fixed front portions of said canard sections relative to said canarded deltoid main aircraft with pivotal said canard sections.

* * * * *